Aug. 5, 1941.  B. S. SMITH  2,251,900
WELL SURVEYING
Filed Sept. 24, 1938

Inventor
BERNARD S. SMITH

Patented Aug. 5, 1941

2,251,900

UNITED STATES PATENT OFFICE 2,251,900

WELL SURVEYING

Bernard S. Smith, Galveston, Tex., assignor of fifty per cent to J. J. Kane, Galveston, Tex.

Application September 24, 1938, Serial No. 231,531

23 Claims. (Cl. 175—182)

The invention relates to means and method for determining the nature of subsurface formations penetrated by a bore hole.

In the drilling of wells, casing is frequently set below known and/or logged producing formations with the intention of perforating such casing at preselected formations for production therefrom. It would be highly advantageous to be able to survey such a cased bore hole in order to accurately locate or to verify the location of the formation or formations from which production is desired. Likewise such a survey is desirable in old wells in which casing may traverse producing formations whose presence, but not location, is known or whose presence and location are only suspected. The present invention enables logging of cased bore holes although, as will more fully appear, the invention comprehends means and method for expeditiously and effectively logging bore holes whether such holes be cased or uncased.

The invention is believed to take advantage of a well known electrical phenomenon evidenced by the variation which is caused in an otherwise steady current state in a conductor, when such conductor is subjected to a magnetic field, or when there are changes in a magnetic field which traverses such conductor. This phenomenon is believed to be that which was publicized after certain measurements and findings made by Hall in 1885 and subsequently confirmed by others, and is commonly known as the "Hall effect." It is to be understood, however, that this suggested explanation or theory of operation is not to be construed as a limitation of the invention but only as a possible explanation of phenomena observed in the practice of the invention more fully hereinafter described.

In the present case it is proposed to pass a current through a conductor within the bore hole to be logged and to progressively subject such conductor and the subjacent earth formations to a magnetic field. Different earth formations have different electrical and magnetic properties which will produce variations in the current state in the conductor and such variations will become apparent from fluctuations in what should be an otherwise steady current state in the conductor within the bore hole.

In accordance with the invention the current fluctuations in the conductor are interpretable in terms of geological strata traversed by a source of magnetic flux to which the conductor is also subjected because the different earth formations appear to be the principal variables. If the procedure is carried out in the cased bore hole, the casing itself may serve as a conductor.

If, on the other hand, an uncased bore hole is to be logged, the operation may be carried out equally effectively by providing a suitable conductor segment which may be lowered into and withdrawn from the bore hole during the period of making observations.

The primary object of the invention is to provide means and method for logging a bore hole by ascertaining the variations in a current flowing through a conductor within the well bore when a magnetic flux is applied to the conductor and is made to traverse the formations to be studied, and then utilizing such variations as indications of the nature of the formations penetrated by the bore hole.

Another object of the invention is to provide simple and effective method and means for logging a bore hole whether or not the casing has been set in the bore hole.

Another object is to apply a steady current flow to a conductor in a well bore and to then move a source of magnetic flux axially of the well bore so that such flux will be applied to and varied by the conductor and surrounding earth formations, and interpreting the variations in the steady current in the conductor as indications of the variations of the earth formations.

Another object is to log a bore hole by passing a current through a conductor within the bore hole and progressively subjecting such conductor and subjacent earth structures to a magnetic field so that the different subjacent structures having different electrical and magnetic properties will cause differences in the magnetic flux which in turn will cause variations in the current flowing in the conductor so that a relationship between the variations in current correlative with changes in traversed formations may be ascertained.

It is also an object to pass a direct current longitudinally through a conductor within a bore hole and to simultaneously and progressively subject a portion of such conductor and surrounding earth structures to an alternating magnetic flux whereby different earth structures will produce fluctuations in an otherwise steady current state in the conductor, such fluctuations being indicative of the nature of these different earth structures.

These objects, together with others will be apparent to those skilled in the art by reference to the following description taken in connection with the drawing in which.

Figure 1:
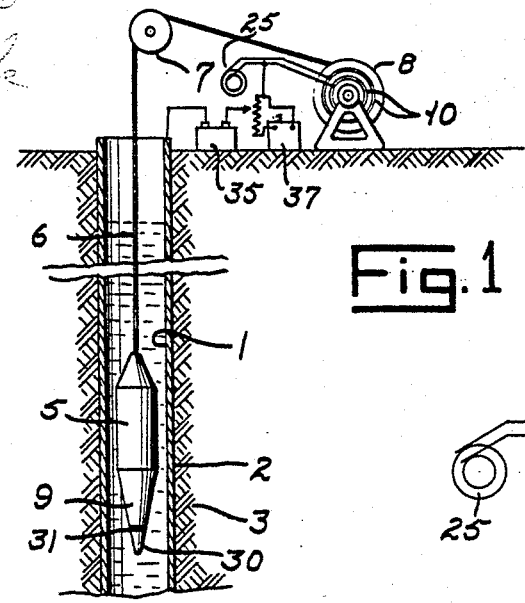
Fig. 1 is a general view showing a vertical section illustrating a manner of utilizing the invention where a cased bore hole is to be logged.

Reference is made to Fig. 1 which illustrates mechanism for carrying out the invention when a cased bore hole is to be logged. The bore hole 1 is provided with a casing 2 which extends downwardly through earth formations 3 of which information is desired. In order to obtain the desired information an exploring unit 5 is lowered into the casing 2 by means of a multi-conductor cable 6 which passes over a sheave 7 to drum 8 located adjacent the mouth of the bore hole. The conductors of the cable 6 terminate in a contacting device such as slip rings 10 on the cable drum 8 so that electrical connections may be made with the elements of the exploring units 5, as will more fully appear by reference to the schematic diagram of Fig. 3.

Figure 3:
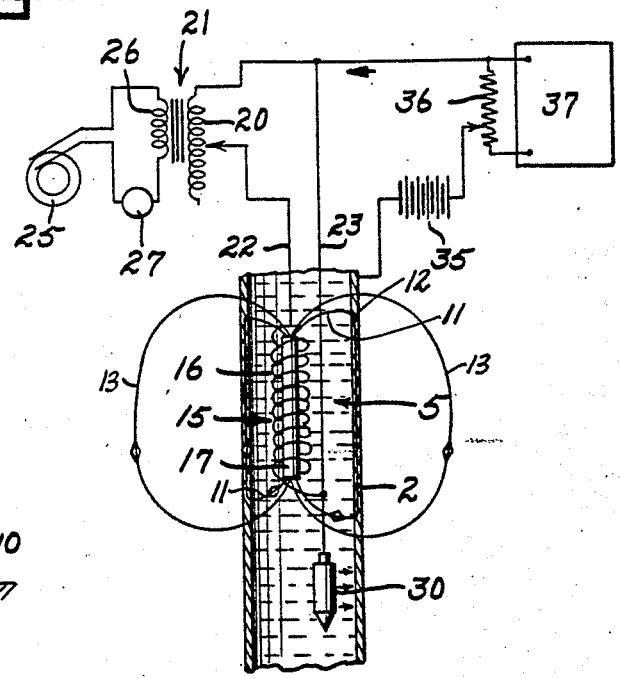
Fig. 3 is a schematic view illustrating the construction of mechanism for carrying out the invention and the electrical circuits which are utilized as well as the direction of flow of the magnetic flux in the bore hole.

In Fig. 3 the exploring unit 5 is shown as including a magnetizing unit 15 comprising a coil 16 and a magnetizable core 17. While the core 17 is shown of bar form, it is to be understood that such core may be of the spool type or of any other suitable form whereby the desired magnetizing effects may be obtained.

The coil 16 is connected to the secondary 20 of a transformer 21 by means of conductors 22 and 23 within the cable 6 supporting the exploring unit 5 within the well bore. It is to be understood that the conductors 22 and 23 include a suitable connection, as already indicated, so that current may be conducted from the secondary 20 to the cable upon and extending from the drum 8. The circuit just described will hereafter be referred to as the magnetizing circuit.

An alternating current generator 25 supplies a varying electromotive force to the primary 26 of the transformer 21 and a suitable indicating instrument 27 is provided in this circuit in order that conditions may be maintained constant or that variations in circuit conditions may be observed or varied in a desired manner.

An electrode 30 is also connected to the conductor 23 and is exposed to contact with the fluid within the casing 2. In event there is a non-conducting fluid or no fluid in the casing 2 the electrode 30 will be so constructed as to make direct contact with the casing. In any event a circuit is completed through the electrode 30, the casing 2, a battery 35 and a resistor 36 to the conductor 23. The resistor 36 is connected to a suitable instrument 37 such as a sensitive meter or recording device so that variations in the current through the battery or indicating circuit may be observed.

In the embodiment shown in Fig. 1 it may be noted that the coil 16, the core 17 and associated wires are enclosed within a housing, the lower end 9 of which is conical and which terminates in the electrodes 39, insulation 31 being interposed so that current in the battery circuit will necessarily flow from conductor 23 and electrode 30 to the casing 2 through the fluid therein.

In the use of the construction just described the exploring unit 5 is lowered within the well by suitably controlling the unreeling of the cable 6 from the drum 8. At the same time current is passed through the circuit including the battery 35, the electrode 30, the casing 2 and the resistor 36. A steady current state should thus be noted in the indicating circuit by observing the indication of the instrument 37. However, as the unit 5 is lowered into the well an exciting current is passed through the coil 16 whereby a magnetic flux is set up to flow transversely of the casing 2. Referring to Fig. 3 it is believed that a portion of this flux will emanate from the ends of the core 17 and will enter and pass longitudinally of the conductor casing 2 in its return to the core end opposite that of emanation. It is believed also that a portion of the flux is leakage flux which passes through the casing 2 and into the surrounding structures.

At any rate, regardless of the theory of explanation the effect produces a change in the current in the circuit of the conductor and such change is determined not only by the presence of the casing or conductor 2, which should be substantially constant, but also by the surrounding earth structure which varies at different elevations. Accordingly as the exploring unit 5 is lowered within the casing 2, variations in the current in the battery circuit will be noted.

Since the casing within the hole is substantially homogeneous and the variations therein, such as joints, are at known levels, the variables giving rise to interpretive data are the electrical characteristics of the different earth formations. Hence the current variations indicated by the instrument 37 may be directly interpreted as due to different earth formations. Corrections to the readings for inhomogeneities in the casing, cement outside of the casing or the mud or other fluid within the casing are ascertainable. Hence indicated variations can be interpreted and analyzed in the light of known facts and the nature of the respective formations determined.

If it is desired to determine variations attributable to the casing, the cement, the mud in the bore or other characteristics separate observations may be made by lowering the exploring unit into the bore hole and obtaining data by using only the exciting current or current in the circuit including the battery 35. With this data at hand the actual survey readings may be corrected to eliminate, compensate or correlate this previously obtained information.

Figure 2:
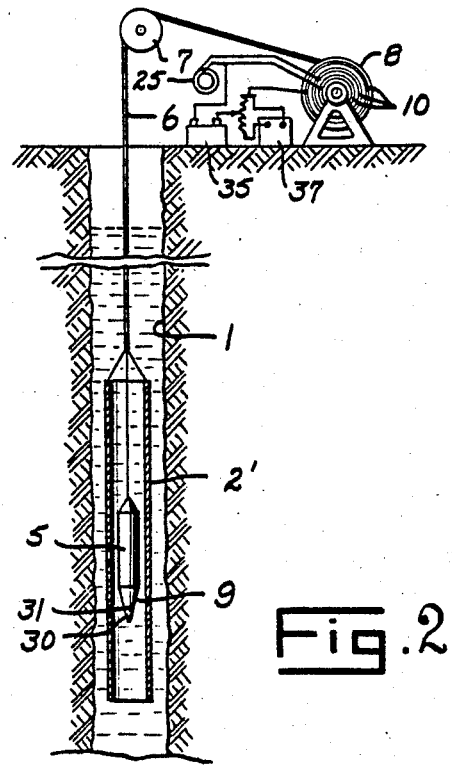
Fig. 2 is a view similar to that shown in Fig. 1 but illustrates the manner of logging an uncased bore hole.

In the modification shown in Fig. 2 wherein no casing has been set within the bore hole 1, a supplemental conductor or dummy casing 2' is lowered within the well bore together with the exploring unit 5 so that a similar physical and electrical environment to that illustrated in Fig. 1 is provided. In this embodiment an added conductor is provided in the cable 6 so that a direct connection may be had between the battery 35 and the dummy casing 2'. It is believed apparent that the operation of this modification of the invention is similar to that already described in connection with Figs. 1 and 3.

From the foregoing it is believed apparent as to the manner of construction and the mode of operation of the present invention. It is apparent that departures may be made from the disclosed construction without departing from the spirit of the invention. For example, the generator 25 has been referred to as an alternating current generator, whereas it is to be understood that such generator is to be any suitable source of electrical energy and may comprise a source of electrical impulses or, by eliminating the transformer 21 between such source and the exploring unit 5, a source of direct current may be utilized. Likewise, it is apparent that instead of the battery 35, any source of current, either direct or alternating may be used.

An alternate mode of operation of the illustrative embodiment would be that of maintaining constant the current in the indicating circuit by controlling, either manually or automatically, the exciting current supplied to the coil 16, in which case the necessary changes in the magnetizing circuit supply the desired data.

Broadly the invention comprehends the provision of method and means for the logging of well bores, whether such bores be cased or uncased, by applying a magnetic flux to a current carrying conductor and the surrounding earth formations and interpreting the effect thereof on the current as an indication of the nature of subsurface structures penetrated by the bore hole.

What is claimed is:

1. A method of logging a cased bore hole comprising the steps of moving an electrode longitudinally of the casing, passing an electric current from the electrode to the casing and longitudinally thereof, moving a source of alternating magnetic flux longitudinally of the casing so that the casing and subjacent earth structure are subjected to the magnetic flux produced by such source, and measuring the current flowing in the casing to determine variations therein as an indication of the variation of the earth formations traversed by the flux source.

2. A method of logging a cased bore hole which comprises moving an electrode longitudinally of the casing within the bore hole, passing an electric current from the electrode to the casing and longitudinally thereof, moving a source of magnetic flux longitudinally of the casing so that the casing and subjacent earth structure are progressively subjected to the magnetic flux produced by such source, and measuring the current flowing in the casing as an indication of the nature of formations traversed by the electrode and the flux source.

3. The method of electrically logging a bore hole comprising the steps of passing an electric current longitudinally through a conductor within the bore hole, progressively subjecting said conductor to an alternating magnetic field, and recording the current flowing in the conductor to determine variations therein as the source of magnetic flux is moved between predetermined levels in the bore hole.

4. The method of electrically logging a bore hole comprising the steps of passing an electric current longitudinally through a tubular conductor within the bore hole, progressively subjecting said conductor and the walls of the well bore to an alternating magnetic field, varying said magnetic field so that the current in the conductor will remain constant as the source of flux is moved between predetermined levels in the bore, and measuring the variations in the magnetic field as an indication of strata traversed by the bore hole.

5. The method of electrically logging a bore hole which comprises establishing an electric circuit in a conductor casing within the bore hole, subjecting said conductor to a magnetic field, and recording variations in the current flowing in the conductor to determine the variation in the circuit conditions as modified by changes in subjacent structure.

6. A process for determining the nature of subterranean strata penetrated by a cased bore hole comprising the steps of passing an electric current longitudinally through the casing within the bore hole, progressively subjecting the casing and subjacent strata to an alternating magnetic flux ascertaining variations in the flow of such current in the casing due to changes in the circuit conditions as caused by the subjacent structure, and interpreting such variation in the electric current in the casing as an indication of the nature of the subjacent earth structures.

7. A process for determining the nature of subterranean strata penetrated by a bore hole comprising the steps of passing an electric current through a section of pipe within the bore hole, simultaneously subjecting such pipe and subjacent strata to a magnetic flux whereby the current through the pipe is varied as a function of the changes in subjacent structure, and interpreting such variations as an indication of the nature of the subjacent structure.

8. A device for logging a cased bore hole comprising a coil, a source of current, a conductor cable for supporting said coil and permitting the coil to be moved within the casing, said cable connecting the coil to the source of current, an electrode movable with said coil and connected to said conductor cable, a second source of current connected to said electrode and the casing, and means for observing the fluctuations in current from said second source of current as the coil and electrode are moved within the casing.

9. A device for logging a cased bore hole comprising, a coil, a source of current, a conductor cable for supporting said coil and permitting the coil to be moved within the casing and for conducting current from the source of current to the coil, means for observing the fluctuations of current within the coil, an electrode movable with said coil and connected to said conductor cable, a second source of current connected to said electrode and the casing, and means for observing the fluctuations in current from said second source of current as the coil and electrode are moved within the casing.

10. A device for logging a bore hole comprising a tubular conductor placed in fluid within the bore hole, an electrode within the tubular conductor and in spaced relation therewith, means within the tubular conductor for subjecting such conductor to a magnetic field, means for varying the depth of the conductor, the electrode and said last mentioned means, means for passing an electric current through a circuit comprising the tubular conductor and said electrode, and means for observing the variations in such electric current as an indication of the nature of traversed subjacent structures.

11. A device of the class described comprising, a tubular conductor adapted to be lowered into fluid within a bore hole, an electrode, means for moving said conductor and electrode within the bore hole, means for passing an electric current through a circuit comprising the electrode and the conductor, a source of magnetic flux within said tubular conductor and movable therewith for subjecting said conductor to a magnetic flux, and means for observing the variations in the electric current through said circuit as said source of magnetic flux is moved between predetermined levels within the bore hole.

12. A device for determining the nature of geological formations traversed by a bore hole comprising a conductor lowerable into the bore hole, means for passing a current through said conductor, means adjacent said conductor for subjecting the conductor and subjacent strata to a magnetic flux, and means for determining the variations in current in the conductor as said conductor and said first mentioned means are simultaneously moved within the bore hole as an indication of the nature of formations traversed by the bore hole.

13. A device for determining the nature of geological formations traversed by a cased bore hole comprising means for passing an electric current longitudinally of the casing within the bore hole, means for progressively subjecting the casing and subjacent earth formations to an alternating magnetic flux, and means for determining the fluctuations in the current in the casing resulting from changes in geological formations subjacent the bore hole.

14. A device for determining the nature of geological formations traversed by a cased bore hole comprising means for passing a current longitudinally of the casing within the bore hole, means for progressively subjecting the casing and subjacent structure to a magnetic flux, and means for measuring the current through the casing to determine current variations due to the changes in geological formations subjacent the bore hole.

15. A method of determining the nature of the earth formations penetrated by a bore hole comprising, recording the effect of an alternating magnetic field progressively set up in the formations upon the current in a circuit carrying a direct current and including a conductor within the bore hole.

16. A method of determining the nature of the earth formations penetrated by a bore hole comprising passing an electric current through a conductor within the bore hole, subjecting the conductor and the surrounding formation to a magnetic flux and ascertaining the effect upon such current of the magnetic field set up in the formation and the conductor.

17. A method of ascertaining the nature and extent of the earth formations penetrated by a well bore after the bore has been drilled and a casing disposed therein which comprises the steps of establishing an electrical circuit in the casing as a conductor, moving a source of magnetic flux in the casing so that the magnetic flux will penetrate the casing and a flow established thru the casing and formation, and recording the current in the casing circuit and any variations therein as attributable to the variation in the flow of the magnetic flux caused by the variation in the earth formations being subjected to the flux.

18. A method of ascertaining the nature and extent of the earth formations penetrated by a well bore after a casing has been disposed therein which comprises the steps of lowering an exploring unit within the casing to determine the localized effects created by drilling and casing the well bore, establishing an electric circuit in the casing, moving a source of magnetic flux longitudinally of the casing, recording the current in the casing and the variations in such current, modifying the recorded current values in accordance with the initial determination of localized effects created in drilling and casing the well bore, and interpreting the modified record to determine the nature and extent of the respective earth formations traversed by the bore hole.

19. The method of determining the nature and extent of component parts of a body of material of varying composition comprising the steps of, passing an electric current transversely of said body, progressively subjecting the material to a magnetic flux along the line of current conduction, and measuring said electric current to determine the variations therein as the source of the magnetic flux is moved.

20. The method of logging a well bore comprising the steps of passing an electric current longitudinally of a bore hole, progressively subjecting the current traversed portion of the bore hole and the surrounding formations to a magnetic field, and measuring said electric current to determine variations therein as different levels in the bore hole are subjected to the magnetic flux.

21. The method of logging a well bore comprising the steps of passing an electric current longitudinally of a bore hole, progressively subjecting the current traversed portion of the bore hole and the surrounding formations to an alternating magnetic field, and measuring said electric current to determine variations therein as different levels in the bore hole are subjected to the magnetic flux.

22. A device for logging a bore hole comprising a tubular conductor within the bore hole, means for passing an electric current longitudinally of said conductor, means for subjecting the conductor and the surrounding formations to a magnetic flux, and means for observing the variations in said current as said last mentioned means is moved within the bore hole.

23. A device for logging a bore hole comprising a tubular conductor within the bore hole, means for passing an electric current longitudinally of said conductor, a source of alternating magnetic flux, means for moving said source longitudinally of the bore hole, and means for determining the variations in said current as the flux source is moved within the bore hole.

BERNARD S. SMITH.